(12) United States Patent
Dennis

(10) Patent No.: US 11,794,326 B2
(45) Date of Patent: Oct. 24, 2023

(54) HAND-HELD POWER TOOL

(71) Applicant: Robert Bosch GmbH, Stuttgart (DE)

(72) Inventor: Daniel Dennis, Nuertingen (DE)

(73) Assignee: Robert Bosch GmbH, Stuttgart (DE)

( * ) Notice: Subject to any disclaimer, the term of this patent is extended or adjusted under 35 U.S.C. 154(b) by 17 days.

(21) Appl. No.: 17/646,012

(22) Filed: Dec. 27, 2021

(65) Prior Publication Data
US 2022/0203514 A1 Jun. 30, 2022

(30) Foreign Application Priority Data

Dec. 29, 2020 (DE) ..................... 10 2020 216 582.3

(51) Int. Cl.
| | |
|---|---|
| *B25F 5/02* | (2006.01) |
| *B23Q 11/00* | (2006.01) |
| *B23D 45/16* | (2006.01) |
| *B23D 49/16* | (2006.01) |

(52) U.S. Cl.
CPC ............ *B25F 5/02* (2013.01); *B23Q 11/0092* (2013.01); *B23D 45/16* (2013.01); *B23D 49/162* (2013.01)

(58) Field of Classification Search
CPC ........... B25F 5/02–029; B23Q 11/0092; B23D 45/16; B23D 49/162
USPC .......................................................... 173/2
See application file for complete search history.

(56) References Cited

U.S. PATENT DOCUMENTS

| | | | | |
|---|---|---|---|---|
| 3,869,021 | A * | 3/1975 | Sutherland | A62B 35/0025 182/7 |
| 4,895,336 | A * | 1/1990 | Lieberman | B25H 3/006 30/388 |
| 6,899,203 | B1 * | 5/2005 | Golden | A62B 1/14 182/5 |
| 8,534,375 | B2 * | 9/2013 | Matsumoto | B25F 5/02 173/171 |
| 10,286,539 | B2 * | 5/2019 | Francis | B27B 9/00 |
| 11,617,922 | B2 * | 4/2023 | Mumford | A63B 29/02 182/134 |
| 2003/0159843 | A1 * | 8/2003 | Sakai | B25F 5/029 173/217 |
| 2010/0031781 | A1 * | 2/2010 | Ito | B25H 3/006 173/217 |

(Continued)

FOREIGN PATENT DOCUMENTS

| | | |
|---|---|---|
| DE | 10 2015 006 695 A1 | 12/2015 |
| DE | 11 2019 001 199 T5 | 12/2020 |

(Continued)

*Primary Examiner* — Dariush Seif
(74) *Attorney, Agent, or Firm* — Maginot, Moore & Beck LLP

(57) ABSTRACT

A hand-held power tool, in particular a saber saw, having at least one holding unit for fastening the hand-held power tool to a holding device, in particular to an arresting cable and/or carabiner clip. The holding unit includes at least one receiving opening for receiving the holding device, and at least one damping element for damping a force transferred from the holding device to the hand-held power tool, in particular to a housing of the hand-held power tool. The damping element includes an at least substantially elastic element that at least partially encloses the receiving opening and receives in a form-fitting manner a fastening part delimiting the receiving opening.

12 Claims, 5 Drawing Sheets

(56) References Cited

U.S. PATENT DOCUMENTS

| | | | |
|---|---|---|---|
| 2011/0073340 A1* | 3/2011 | Matsumoto | B25F 5/02 173/171 |
| 2011/0108300 A1* | 5/2011 | Nagasaka | B25F 5/02 173/171 |
| 2011/0139479 A1* | 6/2011 | Nagasaka | B25F 5/02 173/217 |
| 2012/0085560 A1* | 4/2012 | Kuroyanagi | B25F 5/02 248/692 |
| 2012/0292865 A1* | 11/2012 | Sugimoto | B25F 5/00 279/142 |
| 2013/0062498 A1* | 3/2013 | Ito | B25B 21/00 248/672 |
| 2013/0133981 A1* | 5/2013 | Spraggon | A63B 27/00 182/134 |
| 2013/0199049 A1* | 8/2013 | Xing | B26B 25/00 30/377 |
| 2013/0277079 A1* | 10/2013 | Tsuzuki | B25F 5/006 173/162.2 |
| 2014/0097217 A1* | 4/2014 | Walsh | A45F 5/02 224/268 |
| 2014/0345149 A1* | 11/2014 | Etou | B23D 57/023 30/383 |
| 2015/0343617 A1* | 12/2015 | Kondo | B25B 21/02 173/93 |
| 2016/0059080 A1* | 3/2016 | Frankhauser | A62B 1/14 182/134 |
| 2017/0119137 A1* | 5/2017 | Cirincione, II | B25F 5/02 |
| 2017/0320206 A1* | 11/2017 | Machida | B25D 17/24 |
| 2018/0084895 A1* | 3/2018 | Moreau | B25H 3/00 |
| 2018/0132600 A1* | 5/2018 | Moreau | B25F 5/02 |
| 2018/0156385 A1* | 6/2018 | Giglio | B25F 5/02 |
| 2018/0216700 A1* | 8/2018 | Horgan | F16G 11/046 |
| 2019/0143555 A1* | 5/2019 | Nakashima | B23D 45/16 30/376 |
| 2019/0240859 A1* | 8/2019 | Huber | B25F 5/02 |
| 2019/0374014 A1* | 12/2019 | Flores | A45F 5/02 |
| 2020/0194747 A1* | 6/2020 | Rudolph | H01M 50/213 |
| 2020/0227695 A1* | 7/2020 | Jones | H01M 50/296 |
| 2020/0262047 A1* | 8/2020 | Numata | B24B 23/028 |
| 2020/0316766 A1* | 10/2020 | Machida | A45F 5/00 |
| 2021/0053175 A1* | 2/2021 | Otani | B24B 23/02 |
| 2021/0107130 A1* | 4/2021 | Yoshikane | B25H 3/006 |
| 2021/0154880 A1* | 5/2021 | Osawa | B27B 17/0008 |
| 2022/0024024 A1* | 1/2022 | Garant | B25F 5/02 |
| 2022/0134447 A1* | 5/2022 | Hahn | B25H 3/00 24/298 |
| 2022/0134525 A1* | 5/2022 | Bandy | B25C 5/15 227/123 |

FOREIGN PATENT DOCUMENTS

| | | |
|---|---|---|
| JP | 31-34808 U | 8/2007 |
| WO | 2019/194036 A1 | 10/2019 |

* cited by examiner

HAND-HELD POWER TOOL

This application claims priority under 35 U.S.C. § 119 to patent application no. DE 10 2020 216 582.3, filed on Dec. 29, 2020 in Germany, the disclosure of which is incorporated herein by reference in its entirety.

BACKGROUND

Hand-held power tools are already known. Reference may be made, for example, to the publications U.S. Pat. No. 8,534,375 B2, WO 2019/194036 A1, U.S. Pat. Nos. 4,895, 336, 10,286,539 B2. Such hand-held power tools disclose a possibility of preventing the hand-held power tool from falling down, for example when working on scaffolding or roofs, by means of an arresting cable, in particular a rigid arresting cable having a tensile elongation of less than 3-5%, and of mitigating the arresting shock by the provision of a damper or a spring, and thus avoiding damage to or breakage of the hand-held power tool due to overload upon the fall.

SUMMARY

The disclosure relates to a hand-held power tool having the features and advantageous developments described herein. Provided thereby is at least one alternative device for securing a hand-held power tool without damage in the event of a fall, by use of a holding means, in particular a rigid holding means.

The disclosure is based on a hand-held power tool, in particular a saber saw or circular saw, having at least one holding unit for fastening the hand-held power tool to a holding means, in particular to an arresting cable and/or carabiner clip, the holding unit comprising at least one receiving opening for receiving the holding means, and at least one damping element for damping a force transferred from the holding means to the hand-held power tool, in particular to a housing of the hand-held power tool.

It is proposed that the damping element be realized as an at least substantially elastic element that at least partially encloses the receiving opening and receives in a form-fitting manner a fastening part delimiting the receiving opening. It is thereby possible to provide a low-cost option for arresting hand-held power tools without damage. Even low-cost arresting cables, in particular rigid arresting cables, that have a maximum tensile elongation of 3-5%, can be used without risk of damage to the hand-held power tool in the event of a fall. In particular in the case of hand-held power tools that have bow or gripping-stirrup handles, there is thus the possibility of providing an intuitive, simple and/or low-cost fall protection, in particular to avoid damage to, or even breakage of, bow handles. The axis of the receiving opening in this case may in particular be transverse to the direction of actuation of a control switch, in particular an activation switch. In the event of a fall of the hand-held power tool, in particular a fall from a great height, an unfavorable trajectory and/or an unbraked fall into the arresting cable or the carabiner clip, force peaks can be cushioned, an abrupt braking of the hand-held power tool, which could sometimes result in damage, for example to the holding unit of the hand-held power tool, in breakage of the housing or/and of a handle of the hand-held power tool, in damage to components of the hand-held power tool or the like, can be avoided.

A "hand-held power tool" is to be understood to mean, in particular, a portable, preferably motor-driven, power tool that is designed for performing work on workpieces and that can be transported by an operator without the use of a transport machine, in particular a portable electric power tool, but also hand-held power tools driven by an internal combustion engine. The hand-held power tool has, in particular, a mass of less than 40 kg, preferably less than 10 kg, and particularly preferably less than 5 kg. Examples here include a saber saw or a circular saw, but compass saws, angle grinders, planers, hammers or many other hand-held power tools are also conceivable.

An "arresting cable" is also to be understood to mean an arresting line, an arresting band or the like. A rigid arresting cable is to be understood to mean, in particular, an arresting cable having a maximum tensile elongation of less than 10%, in particular less than 5%, preferably less than 3%.

An "elastic element" is to be understood to mean, in particular, an element that can be repeatedly deformed without the element being mechanically damaged or destroyed as a result and that, in particular, automatically tends toward a basic shape again after a deformation.

That the elastic element at least partially encloses the receiving opening it is to be understood to mean, in particular, that the receiving opening is at least partially enclosed, or surrounded, by the elastic element in at least one sectional plane normal to the opening direction, or opening axis, of the receiving opening. This may be realized, for example, in segments, in particular in segments at regular intervals, or otherwise. Advantageously, the elastic element at least substantially encloses the receiving opening. "At least substantially" in this context is to be understood to mean, in particular, that a deviation from a predefined value is in particular less than 25%, preferably less than 10%, and particularly preferably less than 5%. In particular, the elastic element encloses the receiving opening at least completely in a radial direction, in particular in at least one sectional plane normal to the opening direction, or opening axis, of the receiving opening. The transfer of force from the receiving opening to the housing of the hand-held power tool can be improved as a result. The fastening part can thus be well secured. The damping element is advantageously protected by the fastening part against damage and/or wear.

The fastening part is to be, in particular, a part that has greater robustness, for example a metallic component. In particular, the fastening part is realized as a sleeve or eyelet. In particular, the fastening part is continuous around the receiving-opening axis. The sleeve or eyelet advantageously has a hollow, in particular hollow cylindrical or hollow oval shape or the like, but may also have alternative shapes such as, for example, an angular shape, another non-round shape, or the like. At ends, in particular at free ends, the fastening part has rounded, in particular radially outwardly rounded, ends. The fastening part, as viewed from the receiving-opening axis, may have a convex shape or the like. This increases the robustness of the holding unit and reduces force peaks when the hand-held power tool is arrested by a holding means. In addition, the damping element can thus be protected radially and axially relative to the receiving-opening axis. In addition, a simple form-fit connection can be created radially and axially, relative to the receiving-opening axis, between the fastening part and the damping element.

As a result of the elastic element at least partially enclosing the receiving opening, in particular completely enclosing it radially around the receiving-opening axis, improved damping and delivery of force, from the holding means to the holding unit, can be achieved. The holding unit also makes it possible to effect a compact and well damped transfer of force to the housing of the hand-held power tool.

It is proposed that the receiving opening be integrated into a housing wall of the hand-held power tool, in particular into a housing wall on the handle side. The receiving opening is realized in particular as a through-opening. It preferably has a receiving-opening axis that is transverse, in particular orthogonal, to a direction of guiding of the hand-held power tool, and/or transverse, in particular orthogonal, to a direction of actuation of an actuating element of the hand-held power tool. It may also be transverse, in particular orthogonal, to a sectional plane of housing half-shells, in particular handle half-shells. A housing wall on the handle side is to be understood to mean, in particular, a housing wall in the region of a handle of the hand-held power tool or adjacent to the handle. Advantageously, the receiving opening is not provided directly in the region where a handle is typically gripped by the hand of an operator for the purpose of actuating an operating element, in particular a switch, for example the overmoulded soft-component handle region near the switch, in particular in order not to impair ease of operation when this region is gripped. On the other hand, the receiving opening may advantageously be arranged in an overmoulded soft-component region peripheral to the switch and/or adjacent thereto in order, for example, to enable the handle to be easily gripped again when the hand-held power tool is retrieved after a fall. As a result of the receiving opening, or holding unit, being integrated into the housing wall, drop forces can be transferred in an effective manner to the housing. The drop forces can be transferred by the holding unit in a damped manner between, in particular, a rigid tether and the hand-held power tool, in particular the housing and/or handle of the hand-held power tool, so as to avoid force peaks, which could sometimes result in damage to the hand-held power tool, in particular in the breaking-off of a bow handle, or the like.

It is proposed that the receiving opening be continuous in at least one sectional plane normal to the opening direction, or opening axis, of the receiving opening. In particular, it is completely enclosed radially by the delimiting part. The latter, in turn, is advantageously enclosed in a radial direction by the damping element, and this is preferably enclosed completely in a radial direction by the housing, or the handle. This allows the hand tool to be arrested in a damped manner in any around the opening axis. Force can be transferred in an effective manner to the housing. Protrusion or projection of a receiving opening is avoided, in particular as a separate component.

It is proposed that the fastening part of the holding unit delimiting the receiving opening, and/or the damping element, be designed to support the receiving opening in a movable manner relative to the housing. The occurrence of force peaks can thereby be prevented. In particular, a movement capability is rendered possible at least radially about the receiving-opening axis and/or also axially with respect thereto. Consequently, even a fall from different rotational and tilt angles of the hand-held power tool with respect to the receiving-opening axis can be safely cushioned.

It is proposed that the damping element be realized as an elastomeric element or as a spring element that, with respect to a movement relative to the housing, applies a restoring force to a fastening part delimiting the receiving opening. In this way, the fall of the hand-held power tool can be damped, or cushioned.

It is proposed that the damping element be designed to counteract a movement of the fastening part about a rotational or tilt axis.

Also proposed is a hand-held power tool, in particular a saber saw or circular saw, having at least one holding unit for fastening the hand-held power tool to a holding means, in particular to an arresting cable and/or carabiner clip, the holding unit comprising at least one receiving opening for receiving the holding means, and at least one damping element for damping a force transferred from the holding means to the hand-held power tool, in particular to a housing of the hand-held power tool. The holding unit in this case comprises at least one movably mounted braking element that, for the purpose of damping the force, is designed to act in combination with the damping element, a fastening part that at least partially delimits the receiving opening transferring to the damping element, via a movement of the braking element, in particular in a direction differing from a direction of the force, part of the force in a direction differing from a direction of the force. This allows the force to be distributed transversely with respect to the direction of force action, for example at thin or fragile locations on the housing or handle. In this way, an overload/breakage of the hand-held power tool, or of the housing or handle, can be avoided if it falls into the holding means.

Proposed is a hand-held power tool, in particular a saber saw or circular saw, having at least one holding unit for fastening the hand-held power tool to a holding means, in particular to an arresting cable and/or carabiner clip, the holding unit comprising at least one receiving opening for receiving the holding means, and at least one damping element for damping a force transferred from the holding means to the hand-held power tool, in particular to a housing of the hand-held power tool. The holding unit has at least one movably mounted braking element that, for the purpose of damping the force, is designed to act in combination with a damping element, a fastening part that delimits the receiving opening transferring to the damping element, via a movement of the braking element, at least part of the force in a direction differing from a direction of the force, in particular an orthogonally differing direction. For this purpose, the braking element, or the mutually opposite braking elements that in particular are displaceable in opposite directions, in particular braking element(s) that is/are displaceable substantially orthogonally to the direction of movement of the fastening part, has/have an inclined surface/inclined surfaces. The damped force distribution, in particular also in a direction differing from the direction of the force, makes it possible to avoid overload, in particular of the housing, preferably of the handle of the hand tool.

It is proposed that the hand-held power tool have a switch that is configured to switch off the hand-held power tool, in particular to at least indirectly switch off a drive unit of the hand-held power tool, upon a displacement of at least one component of the holding unit, in particular of the receiving opening, of the fastening part, of the damping element and/or of the braking element, with respect to a housing of the hand-held power tool. At least indirectly it is to be understood to mean that the switch emits, for example, a corresponding signal to an open-loop or closed-loop control unit of the hand-held power tool or directly interrupts the electric circuit to the drive unit of the hand-held power tool.

It is proposed that the hand-held power tool have a sensor that is configured to sense a displacement, in particular a displacement exceeding a threshold value, of at least one component of the holding unit, in particular of the receiving opening, of the fastening part, of the damping element and/or of the braking element, and/or a force exerted by at least one component of the holding unit, in particular at least a force exerted indirectly upon the housing of the hand-held power tool, in particular in order to switch off the hand-held power tool at least indirectly in dependence on the sensed sensor signal, for example indirectly via the open-loop or closed-loop control unit of the hand-held power tool.

Thus, in addition to the damping/braking of the arresting shock, emergency off of the hand-held power tool can also be achieved, or initiated. The safety of the hand-held power tool can thereby be increased. It is conceivable for a warning indication, for example a warning signal or warning tone, to be output in addition. A warning indication could be output, for example, via an HMI, a communication module, a warning light, a warning signal tone, or the like.

The switch could be fastened, for example, to the housing or in the handle, and have a switching surface or a lever projecting toward the fastening part. Displacement of the receiving opening, or of the fastening part, would cause the switch to be displaced and would interrupt, at least indirectly, an electric circuit of the hand-held power tool. Activation of the switch could be effected by an operator-actuated push button, insertion pin, or other device to return the switch to its initial position. The switch could also be moved back automatically if, for example, it only outputs a switch-off signal to an open-loop or closed-loop control unit of the hand-held power tool to switch off the drive unit. Reactivation of the hand-held power tool could be effected by actuation of the switch 36 of the hand-held power tool 12, or by other means, e.g., via an HMI, ancillary switch, communication module (e.g., app on smartphone that can communicate, e.g. contactlessly, with the hand-held power hand tool), or the like. The sensor could be realized, for example, as a strain gauge (force sensor) or a resistance sensor or capacitive sensor (e.g. as a proximity or displacement sensor). For example, it could be realized by a plurality of insulated foil layers (sandwich: one side positively charged, an electrolyte in between, the other side negatively charged). As soon as a compression of the damping element or displacement of the mounting part or the like occurs, the output signal of the sensor changes. If, for example, a drop into the holding means causes a compression to exceed a threshold value, which is detected, for example, by an open-loop or closed-loop control unit of the hand-held power tool to which the sensor signal is applied, a switch-off, or an emergency switch-off, of the hand-held power tool is effected. A strain gauge could be arranged, for example, in a semicircular shape around the receiving opening, with the objective of measuring a longitudinal elongation of a component of the holding unit, e.g. of the damping element, and transmitting this signal to an open-loop or closed-loop control unit of the hand-held power tool, on the basis of which the drive unit could be switched off. The safety of the hand-held power tool is thereby increased. In particular, the switch-off is effected in the event of a fall into the arresting cable. The emergency switch-off could also additionally be effected, in particular earlier, by use of a fall detection (e.g. acceleration measurement—according to the logic: if gravitational measurement of the hand-held power tool is zero over a given period of time, there is a fall of the hand-held power tool) and emergency switch-off. Thus, a redundant emergency switch-off could be effected in this way.

The hand-held power tool according to the disclosure is not intended in this case to be limited to the application and embodiment described above. In particular, the hand-held power tool according to the disclosure may have individual elements, components and units that differ in number from a number stated herein, in order to fulfill a principle of function described herein.

BRIEF DESCRIPTION OF THE DRAWINGS

Further advantages are given by the following description of the drawings. The drawings show two exemplary embodiments. The drawings, the description and the claims contain numerous features in combination. Persons skilled in the art will expediently also consider the features individually and combine them to form appropriate further combinations.

In the drawings.

DETAILED DESCRIPTION

Figure 1:
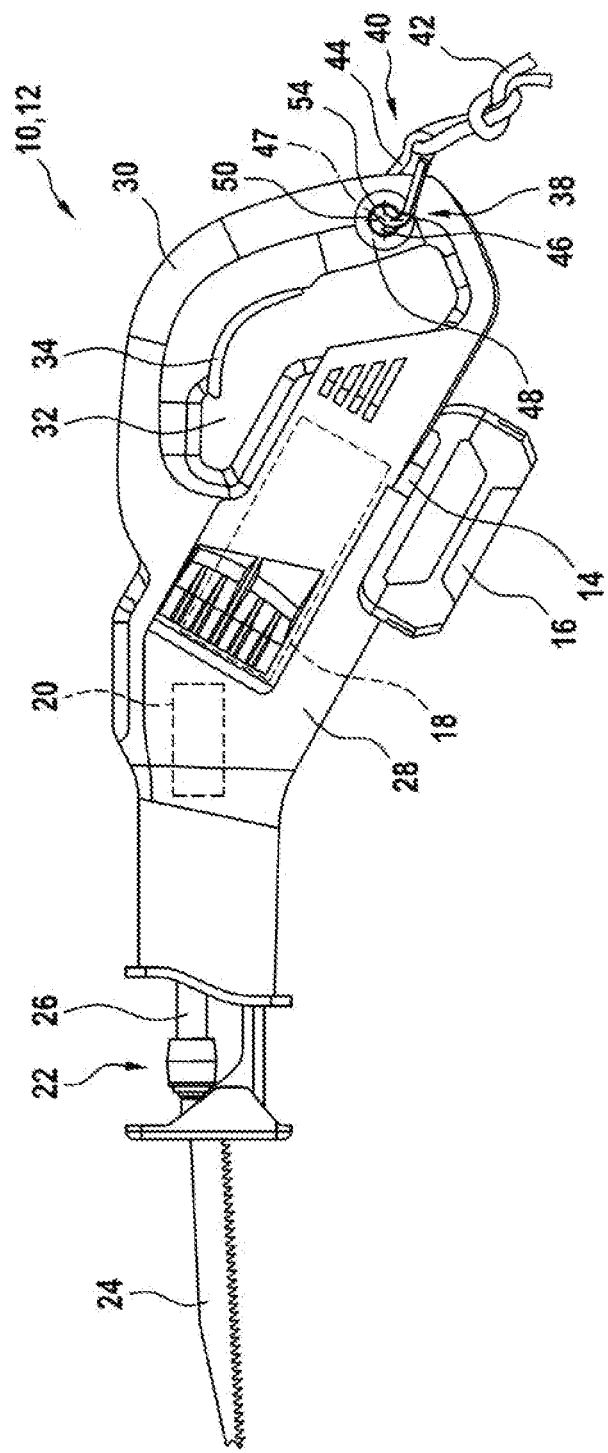
FIG. 1 shows a hand-held power tool according to the disclosure, in a schematic side view.

FIG. 1 shows a hand-held power tool 12, realized as a saber saw 10. The hand-held power tool 12 is an electric hand-held power tool. The hand-held power tool 12 is realized as a battery-operated hand-held power tool 12. It has a battery interface 14 for mechanical and electrical coupling to a battery pack 16. The latter is designed to provide energy, or electrical power, at least to a drive unit 18 of the hand-held power tool 12. Alternatively, the hand-held power tool 12 may also be realized as a mains-connected hand-held power tool, in particular having a mains cable and mains plug connector, or as a hand-held power tool driven by an internal combustion engine or the like (not represented here). Alternative hand-held power tools according to the disclosure such as, for example, compass saws, circular saws, angle grinders, sanders, rotary hammers and many more, will not be discussed in detail here, since the basic structure, the drive concept and/or the mode of operation are assumed to be sufficiently known to persons skilled in the art.

The saber saw 10 has a total mass of, for example, between 2 kg and 4 kg. In principle, however, a hand-held power tool may also have a lesser or greater mass, in particular less than 20 kg, preferably less than 10 kg, more preferably less than 5 kg. Via a transmission unit 20 the drive unit 18 drives a tool receiver 22 for receiving a saw blade 24. The transmission unit 20 is designed to convert a rotating driving motion of the drive unit 18 into an oscillating stroke motion, or stroke and reciprocation motion, which is transferred to the saw blade 24, or an insert tool, arranged in the tool receiver 22. The tool receiver 22 is connected to the transmission unit 20 via a stroke rod 26.

The hand-held power tool 12 additionally has a housing 28. The housing 28 may be formed of half shells, be realized as a barrel-type design, be a combination thereof, and/or otherwise. The housing 28 may be made at least partially, in particular substantially, from plastic. The housing 28 accommodates at least drive-train components, in this case the drive unit 18, the transmission unit 20, etc. The hand-held power tool 12 additionally has a handle 30. It may be realized, at least partially, as a single piece with the housing 28 and/or at least be connected to the latter. In the case of this saber saw 10, the handle 30 is of a bow design. An opening 32, through which at least fingers of a user's hand can be inserted, is provided between a region of the housing 28, which here accommodates the drive unit 18, and the handle 30. Similar handles 30, often referred to as bow handles, are to be found, for example on bow compass saws, circular saws and/or other hand-held power tools, which are not represented here but are assumed to be known to persons skilled in the art. Other handle shapes are conceivable, including those formed by the housing encompassing the drive unit, or the like. The particular feature of bow handles, however, is that users are in principle inclined to attach an arresting cable directly around the handle 30, in particular to knot it or the like, because it cannot easily slip off the handle. In particular in the case of rigid arresting cables that have an elongation capability of <5%, in particular <3%, force peaks, or holding forces, can occur during the fall that result in overloading of the handle 30, or of the housing 28, and sometimes in the breaking or breaking-off of the handle 30. The hand-held power tool 12 additionally has an actuating element 34, in particular in the form of a switch 36. Actuation of the latter enables the hand-held power tool 12 to be activated and deactivated.

The hand-held power tool 12 has at least one holding unit 38, in particular to avoid overloading or breaking of the housing 28 or of the handle 30. It is designed to fasten the hand-held power tool 12 to a holding means 40, in particular to an arresting cable 42 and/or carabiner clip 44, or to another holding, or fastening, means. The holding unit 38 has at least one receiving opening 46 for receiving the holding means 40. The holding unit 38 additionally has at least one damping element 48. The damping element 48 is realized as an at least substantially elastic element, for example as a rubber-elastic element. It encloses the receiving opening 46 at least partially, in this case in particular completely in a radial direction, preferably in a radial direction transversely with respect to the direction of view, or transversely with respect to the axis of the receiving opening 46, in particular the receiving-opening axis 47. A fastening part 50 delimiting the receiving opening 46 is received in a form-fitting manner, in particular is enclosed completely in a radial direction, by the damping element 48, or the elastic element. The fastening part 50 may also at least partially enclose the damping element 48 axially, in particular in order to protect it from damage in the region of the receiving opening 46. A contour, in particular an inner contour of the damping element 48, or of the elastic element, advantageously matches a contour, in particular an outer contour, of the fastening part 50. In particular, the fastening part 50 and the damping element 48 have corresponding form-fit contours that produce a radial and/or axial form-fit, for example corresponding surfaces, grooves and/or webs, or the like. As a result, radial and/or axial forces acting upon the fastening part 50, in particular fall forces, can be cushioned, or transferred in a damped manner to the housing 28, or to the handle 30 of the hand-held power tool.

Figure 2:
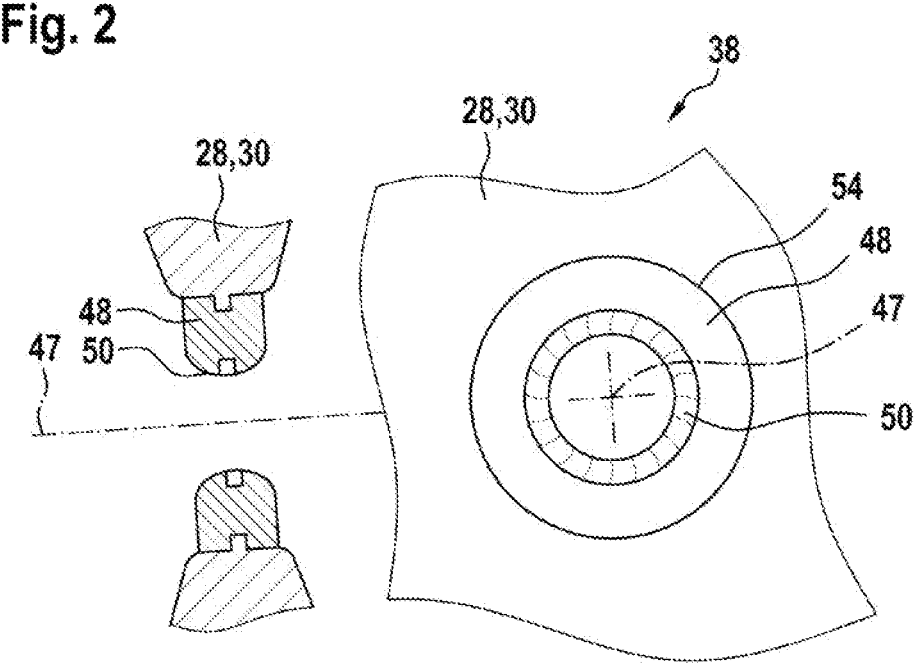
FIG. 2 shows an enlarged representation of the holding unit, in a sectional representation and a side view.

The structure of the holding unit 38, in the case of the saber saw 10 illustrated, is described as an example in the following and depicted in the enlarged representation of FIG. 2. The receiving opening 46 is delimited radially by an annular fastening part 50, in this case in particular made of a wear-resistant material, e.g. a metal sleeve or eyelet, in this case a circular metal sleeve. The latter has rounded free edges. As viewed in a radial direction from the receiving-opening axis 47, the contour of the fastening part 50 is convex. It may also have a different contour. The receiving opening 46, or the fastening part 50, may also, at least instead of a circular shape, have an oval, angular or other shape. The inner and outer contours of the fastening part 50 may also differ and may sometimes be adapted to the space, material, typical holding, dropping or carrying constraints and/or ideal force transmission constraints of the hand-held power tool 12. For example, the holding unit 38, in particular the damping element 48 of the holding unit 38, may be reinforced or thickened in the region of the holding unit 38 that faces away from the drive unit 18. This this region is often subjected to fall forces, or the like. The receiving opening 46 has a minimum (inner) diameter that is selected in such a manner that typical holding means 40 for securing the hand-held power tool 12 can easily be inserted through it. Thus, in this case, an inner diameter is greater than a cable diameter, or cross-section of a carabiner clip arm. The receiving opening 46, or the fastening part 50, is enclosed radially by the damping element 48, or the elastic element. The damping element 48, or the elastic element, is arranged between the housing 28, or the handle 30. It thus damps forces, in particular fall forces, that act upon the fastening part, with respect to the housing 28, or handle 30. Due to the all-round radial enclosure of the fastening part 50, this damped transmission of force is advantageously effected, in particular effected equally well, in all rotational positions of the hand-held power tool 12 about the receiving-opening axis 47. A segment-type radial enclosure could likewise be provided, for example with damping element segments at regular intervals, or angles. Moreover, owing to the substantially complete radial enclosure, the forces are transferred very homogeneously to the housing 28, or to the handle 30, since a radial displacement of the fastening part results at least in a compressive load and, on the opposite side, in a tensile load on the damping element, or elastic element, on the housing 28, or handle 30. The same also applies to an axial or proportionally axial load acting along the receiving-opening axis 47. Axial form-fit elements such as, for example, radially and/or axially corresponding surrounds, grooves, projections and/or the like on the fastening part 50, the damping element 48 and/or the housing 28, or handle 30, and/or the further fastening part 54. Likewise, good adhesion between the fastening part 50 and the damping element 48 allows axial and/or radial forces to be transferred in a damped manner to the housing 28, or the handle 30, of the hand-held power tool 12. A fall of the hand-held power tool 12 in different rotational and/or tilt positions about the receiving-opening axis 47 can be arrested in a manner that does not damage the material of the hand-held power tool. The receiving-opening axis 47 is advantageously aligned transversely with respect to a direction of actuation of the switch 36, thereby enabling falls of the hand-held power tool from an often substantially vertical direction of movement or working of the hand-held power tool, or direction of movement or working of the hand-held power tool in the direction of earth gravitational force, to be well damped, or cushioned.

The elastic element, or damping element 48, thus radially encloses in a form-fitting manner the fastening part 50—in this case the metal sleeve or eyelet—that delimits the receiving opening 46. Other support elements may be provided. For example, a further fastening part 54, e.g. a further metal sleeve having a greater diameter or the like, which is accommodated by the housing 28, or handle 30, and in particular encloses the elastic element, or damping element 48, again in a form-fitting manner, in particular encloses it substantially completely in a radial direction. The elastic element, or damping element 48, can thus be accommodated in a form-fitting manner on the housing 28, and/or on a further fastening element, in particular on a further fastening element realized as an adapter between the housing 28 and the damping element 48. In this way, the distribution of force to the housing 28, or to the handle 30, can sometimes be further improved, and a localized overloading of the housing 28 can be avoided. Asymmetrical damping elements or additional support elements may be provided. For example, a construction as described in FIGS. 3A, 3B, and 3C may also be provided in addition.

It is conceivable for a soft component of the handle to constitute the damping element of the holding unit 38, and/or to fix the further fastening part 54 on the housing, and/or surround it. This enables production and/or assembly steps to be omitted, and a combinational use of the soft component can be achieved.

The damping element 48 or a damping means can in particular attenuate, or damp, force peaks in an abrupt stopping of the fall of a hand-held power tool 12 by the holding means 40, in particular in the case of a fall from a great height and/or into a rigid arresting cable 42. The damping element 48 can advantageously cushion force peaks that could otherwise act directly upon the housing 28. In this way also, what are sometimes sensitive components of the hand-held power tool 12, such as electronic components, the battery interface 14 or the like, can be protected from overload and/or damage. A holding unit 38 according to the disclosure represents a solid and/or low-cost way of securing the hand-held power tool 12 with an arresting cable, in particular securing it without damage in the event of a fall.

It is proposed that the holding unit 38, or the receiving opening 46, the damping element 48 and the fastening part 50 be integrated into a housing wall of the hand-held power tool 12, in particular into a housing wall on the handle side. In particular, the receiving opening 46 extends through the housing wall on the handle side. A housing wall on the handle side is to be understood to mean, in particular, a housing wall in the region of a handle 30 of the hand-held power tool 12 or adjacent to the handle 30. The receiving opening 46 is realized in particular as a through-opening. It preferably has a receiving-opening axis 47 that is transverse, in particular orthogonal, to a direction of guiding (at least parallel to the viewing plane of FIG. 1) of the hand-held power tool, and/or transverse, in particular orthogonal, to a direction of actuation of an actuating element (direction, or plane, of switch actuation) of the hand-held power tool. It may also be transverse, in particular orthogonal, to a sectional plane of housing half-shells, in particular handle half-shells. Advantageously, the holding unit 38 is not provided directly in the region to be gripped near the switch, where a handle 30 is typically gripped by the hand of an operator for the purpose of operation, in particular for the purpose of switching the hand-held power tool 12 on and off, for example the overmoulded soft-component handle region near the switch, in order not to impair ease of operation when this region is gripped. On the other hand, the holding unit 38 may advantageously be arranged in an overmoulded soft-component region peripheral to the switch and/or adjacent thereto in order, for example, to enable the handle to be easily gripped again when the hand-held power tool is retrieved after a fall. The integration into the housing wall enables drop forces to be transferred in an effective manner to the housing.

The receiving 46 opening is continuous in at least one sectional plane normal to the opening direction, or normal to the receiving-opening axis 47, of the receiving opening 46. The fastening part 50 of the holding unit 38 delimiting the receiving opening 46, and/or the damping element 48, is/are designed to support the receiving opening 46 in a movable manner relative to the housing 28. The damping element 48 is realized as an elastomeric element that, with respect to a movement relative to the housing 28, applies a restoring force to a fastening part 50 delimiting the receiving opening 46. The damping element 48 is designed to counteract a movement of the fastening part 50 about a rotational or tilt axis, in particular of the receiving-opening axis 47.

Figure 3A:
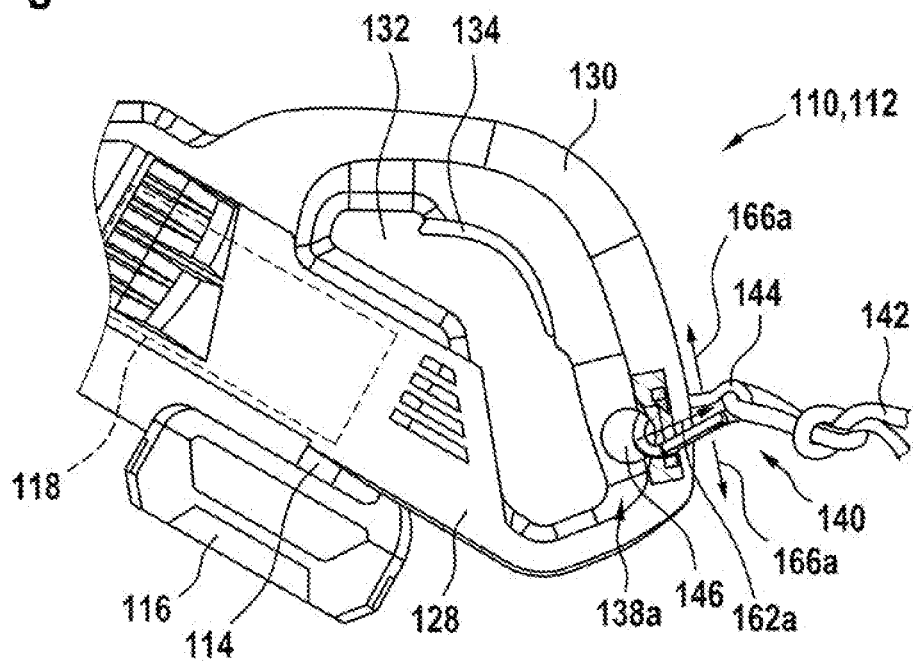
FIGS. 3A, 3B, and 3C show a portion of a further hand-held power tool according to the disclosure, in a side view.

FIG. 3A shows a portion of a further hand-held power tool 112 according to the disclosure. It is likewise realized as a saber saw 110 and, as such, has substantially the same features as the hand-held power tool 12, or saber saw 10, of FIG. 1, for which reason only the hundreds digit has been added to references of components that are at least substantially similar or that act in an analogous manner. These parts and components will therefore not be discussed again, but reference is made to the above. Represented in FIG. 3B, at least partially, is an enlarged schematic sketch of the holding unit 138a of FIG. 3A. The damping element(s) 148 is/are realized as an elastomeric element/elastomeric elements. Represented in FIG. 3C, at least partially, is an enlarged schematic sketch of the holding unit 138b, which is similar in construction to the holding unit 138a of FIG. 3A and/or FIG. 3B. However, instead of being realized as an elastomeric element/elastomeric elements, the damping element(s) 148b is/are realized as a spring element/spring elements, in particular compression spring element(s). Also possible in principle is a combination of elastomeric element and/or spring element, or an elastomeric element on one side and a spring element on the other, or the like.

Figure 3B:
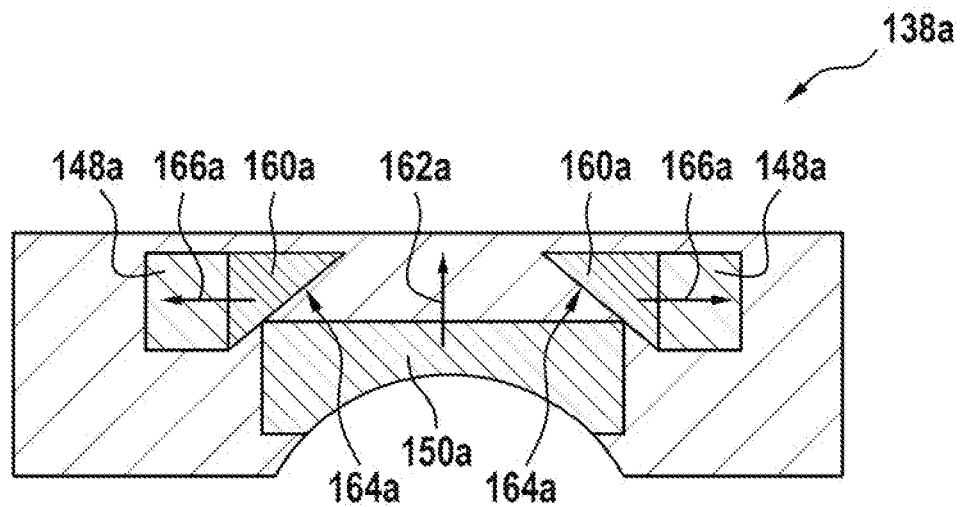
Figure 3C:
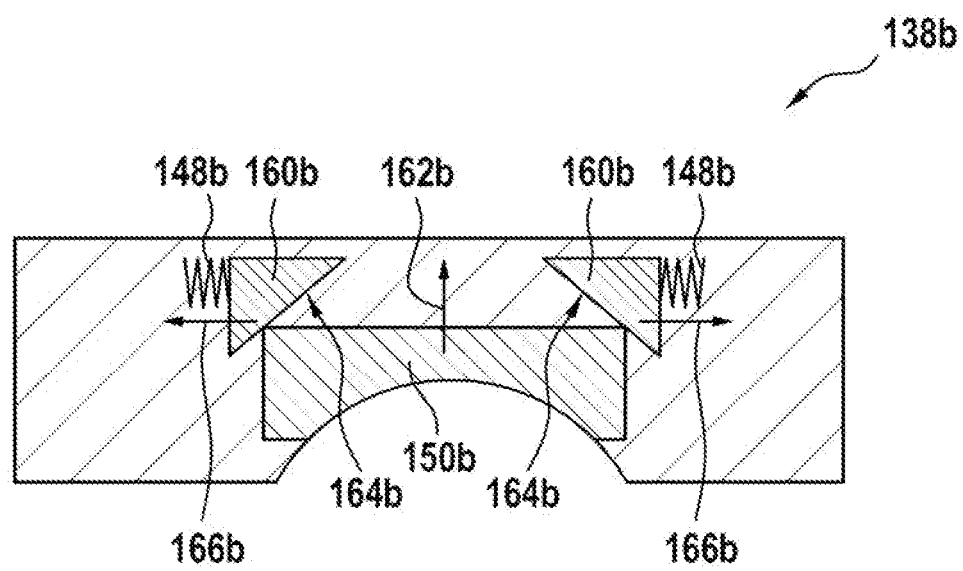

The holding unit 138a, 138b of FIG. 3A, FIG. 3B, FIG. 3C has at least one movably mounted braking element 160a, 160b that, for the purpose of damping the force 162a, 162b, is designed to act in combination with at least one damping element 148a, 148b, a fastening part 150a, 150b that delimits the receiving opening 146 transferring to the damping element 148a, 148b, via a movement of the braking element 160a, 160b, at least part of the force 162a, 162b in a direction 166a, 166b differing from a direction of the force 162a, 162b, in particular an at least partially orthogonally differing direction 166a, 166b. For this purpose, the braking element 160a, 160b, or the mutually opposite braking elements 160a, 160b, which in particular are displaceable in opposite directions, in particular braking element(s) 160a, 160b that is/are displaceable substantially orthogonally to the direction of movement of the fastening part 150a, 150b, has/have an inclined surface/inclined surfaces 164a, 164b. Via the damping element(s) 148a, 148b, the braking element 160a, 160b is supported and/or guided on the housing 128, or on the handle 130 of the hand-held power tool 112, in a direction 166a, 166b differing from a direction of the force 162a, 162b, in particular a direction 166a, 166b differing orthogonally from the direction of the force 162a, 162b. Advantageously, the mutually opposite braking elements 160a, 160b and/or the damping elements 148a, 148b are of mirror-symmetrical construction. As a result of the braking element(s) 160a, 160b being supported/guided, in particular linearly (not represented here) on the housing 128, or handle 130 of the hand-held power tool 112, the braking element(s) 160a, 160b can advantageously also be supported in the direction opposite to the force 162a, 162b. When the force 162a, 162b is applied, it can therefore be distributed via the support/guide, which is in particular linear, and the damping elements 148a, 148b, both in the direction of the force 162a, 162b and in the direction 166a, 166b differing from the direction of the force 162a, 162b, in particular orthogonally thereto. As a result, the housing 128, or the handle 130, is not loaded only in the direction of the force 162a, 162b. The damped force distribution, in particular also in a direction 166a (in this case, parallel to the longitudinal alignment of the handle 30) differing from the direction of the force 162a, 162b, makes it possible to avoid overload, in particular of the housing 128, or of the handle 130. Through the choice of the angle of the inclined surface(s) 164a, 164b and/or a possible pairing of inclined surfaces of the fastening part 150a, 150b and the braking element 160a, 160b, for example through the choice of their surface pairing, e.g. roughness, sliding properties, etc., the force distribution, or force delivery, to the housing 128, or the handle 130, can be adapted, or designed, as required. The fastening part 150a, 150b may be realized as a segment of the receiving opening 146, in particular a circular segment, as a plurality of circular segments and/or at least substantially completely enclosing the receiving opening 146. It may act directly or indirectly upon the braking elements 160a, 160b. The damping element(s) 148a, 148b at least indirectly apply a restoring force to the brake element(s) 160a, 160b, or the fastening part 150a, 150b, with respect to a movement relative to the housing 128. In principle, the holding units 38, 138a, 138b of FIG. 1 and FIG. 2 and of FIGS. 3A, 3B, and 3C, respectively, can be combined. For example, the further fastening part 54 could constitute the fastening part 150a, 150b, or the like.

Figure 4A:
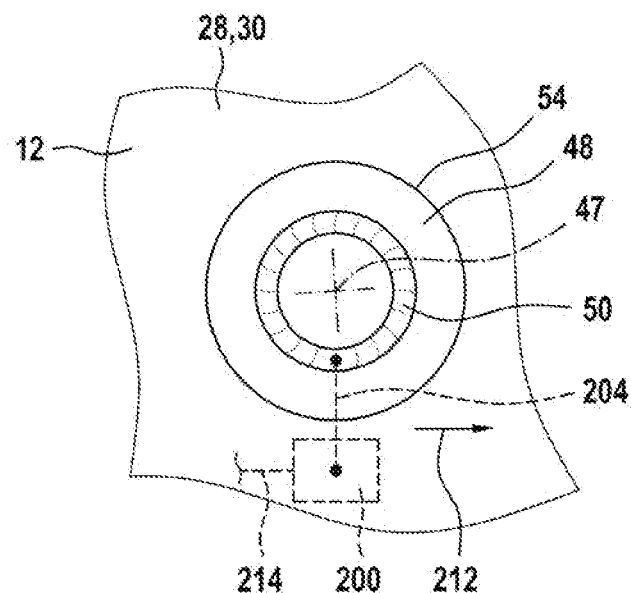
FIGS. 4A, 4B, and 4C show a portion of another hand-held power tool according to the disclosure, in a side view.

The hand-held power tool 12 according to FIG. 1 or FIG. 3A could also, as shown by the detail representation FIG. 4A, have a switch 200 that is configured to switch off the hand-held power tool 12, in particular to at least indirectly switch off a drive unit 18 of the hand-held power tool 12, upon a displacement of at least one component of the holding unit 38, 138, in particular of the receiving opening 46, 146, of the fastening part 50, 150, of the damping element 48, 148 and/or of the braking element 160, in particular with respect to a housing 28 or handle 30 of the hand-held power tool 12. For this purpose, the switch 200 could be arranged in the handle 30 of the hand-held power tool 12 (according to FIG. 4A, as an example, a tiltable lever 204 that is connected to the fastening part 50 and that, by displacement in the direction of the arrow 212, emits a switching signal to an open-loop or closed-loop control unit (not shown) of the hand-held power tool 12 via the signal line 214).

The switch 200 could, for example, be fastened to the housing 28 or arranged in the handle 30, and have a switching surface or a lever 204 projecting toward the fastening part 50 (see FIG. 4A). Displacing of the receiving opening 46, or of the fastening part 50, in the direction of the arrow 212 would cause the switch 200 to be activated, and a circuit of the hand-held power tool (not represented here) could be interrupted at least indirectly via a switching signal that could be emitted to an open-loop or closed-loop control unit (not shown) of the hand-held power tool 12 via a signal line 214. Reactivation of the switch 200 could be effected by an operator-actuated push button, insertion pin, or other device (not represented here). The switch 200 could also be moved back automatically if, for example, it were only to output a switch-off signal to an open-loop or closed-loop control unit (not represented here) of the hand-held power tool 12 to switch off the drive unit. Reactivation of the hand-held power tool 12 could also be effected by renewed actuation of the switch of the hand-held power tool 12, or by other means, e.g., via an HMI, ancillary switch, communication module (e.g., app on smartphone that can communicate, e.g. contactlessly, with the hand-held power hand tool), or the like (not represented here).

Figure 4B:
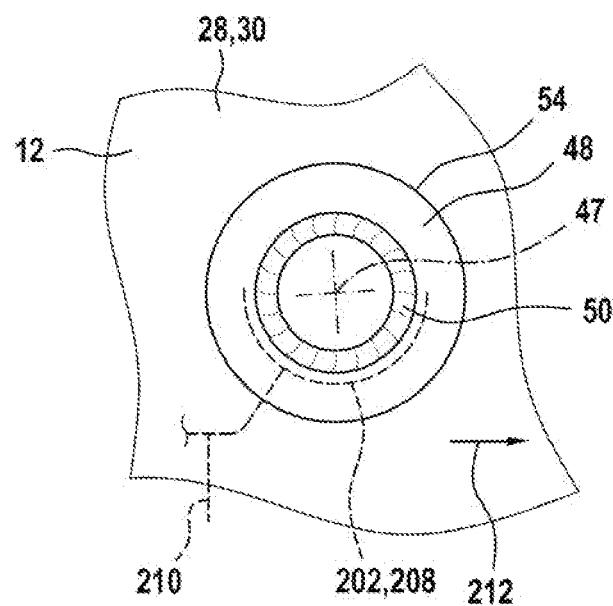

A sensor 202 could also be realized, as shown by FIG. 4B, for example, as a strain gauge 208 (force sensor). As soon as a compression of the damping element 48 or displacement of the fastening part 50, 150 or the like occurs, there is a change in the output signal of the sensor 202, which it could transmit via the signal line 210 to an open-loop or closed-loop control unit, not represented. Upon a threshold value stored in the open-loop or closed-loop control unit being exceeded, there would be a switch-off, or emergency switch-off, of the hand-held power tool 12. The strain gauge 208 could advantageously be arranged in a semicircular shape around the receiving opening 46, in particular in a semicircular shape opened transversely to an expected main displacement direction (substantially in the direction of the arrow 212), with the objective a longitudinal elongation, in particular in a main tensile direction (substantially in the direction of the arrow 212). An emergency switch-off could additionally be effected, in particular earlier, by use of a fall detection by means of an acceleration sensor attached to the hand-held power tool 12, or the like (not shown here). A redundant emergency switch-off could thus be effected.

Figure 4C:
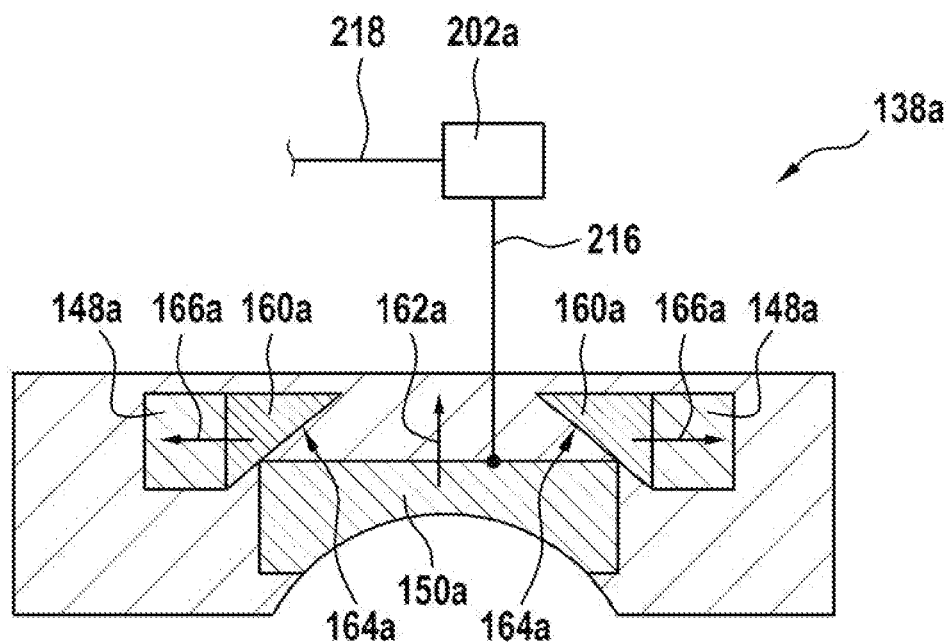

The hand-held power tool 12 could also, as represented in simplified form in FIG. 4C, have a sensor 202a that is configured to sense a displacement, in particular a displacement exceeding a threshold value, of at least one component of the holding unit 138a, in particular of the fastening part 150a, of the damping element 148a and/or of the braking element 160a, and/or a force exerted by at least one component of the holding unit 138a, in particular at least a force exerted indirectly upon the housing 28 of the hand-held power tool 12. The hand-held power tool 12 could be switched off at least indirectly in dependence on the sensed sensor signal, for example indirectly via an open-loop or closed-loop control unit of the hand-held power tool 12 that ascertains when a threshold value is exceeded and thereupon switches off the hand-held power tool 12, in particular by comparing the sensed sensor signal with measurement values stored in a memory of the open-loop or closed-loop control unit and, upon a stored threshold value being exceeded, switching off the drive unit. The sensor 202a in this case would be fixed in the housing of the hand-held power tool, for example, in order to sense a displacement of the holding unit, or a displacement of a component of the holding unit—in this case of the fastening part 150a—by means of an arm 216. The sensor 202a would convert the displacement into a sensor signal. The sensor signal could be transmitted to the open-loop or closed-loop control unit via a signal line 218.

What is claimed is:

1. A hand-held power tool comprising:
   a housing; and
   at least one holding unit configured to fasten the hand-held power tool to a holding device, the at least one holding unit including at least one receiving opening configured to receive the holding device, the at least one holding unit comprising:
   a fastening part delimiting the at least one receiving opening; and
   at least one damping element configured to damp a force transferred from the holding device to the power tool such that a damped force is transferred to the housing, wherein the at least one damping element is an at least substantially elastic element that at least partially encloses the at least one receiving opening, and wherein the at least one damping element receives, in a form-fitting manner, the fastening part.

2. The hand-held power tool according to claim 1, wherein:
   the at least one receiving opening is integrated into a housing wall of the housing as a through-opening,
   the at least one receiving opening defines a receiving-opening axis that is transverse to a direction of guiding of the hand-held power tool and/or transverse to a direction of actuation of an actuating element of the hand-held power tool.

3. The hand-held power tool according to claim 2, wherein the at least one receiving opening is at least substantially continuous in at least one sectional plane normal to the receiving-opening axis of the at least one receiving opening.

4. The hand-held power tool according to claim 1, wherein the fastening part is configured as a sleeve or an eyelet.

5. The hand-held power tool according to claim 2, wherein the at least one damping element and the fastening part form a radial and axial form-fit with respect to the receiving-opening axis.

6. The hand-held power tool according to claim 1, wherein the fastening part and/or the at least one damping element are/is movable relative to the housing.

7. The hand-held power tool according to claim 1, wherein:
the at least one holding unit further comprises at least one movably mounted braking element configured to act in combination with the at least one damping element to damp the force, and
the fastening part is configured to transfer to the at least one damping element, via a movement of the at least one braking element in a direction differing from a direction of the force, at least part of the force in the direction differing from the direction of the force.

8. The hand-held power tool according to claim 1, wherein the at least one damping element is configured as an elastomeric element or as a spring element that, with respect to a movement relative to the housing, applies a restoring force to the fastening part.

9. The hand-held power tool according to claim 1, wherein the at least one damping element is configured to counteract a movement of the fastening part about a rotational or tilt axis.

10. The hand-held power tool according to claim 1, further comprising:
a bow handle portion of the housing,
wherein the at least one holding unit is arranged on or in a region of the bow handle portion, and
wherein the at least one receiving opening extends through the bow handle portion.

11. The hand-held power tool according to claim 1, further comprising:
a switch mounted on the housing and configured to switch off the hand-held power tool upon a displacement of at least one component of the at least one holding unit with respect to the housing.

12. The hand-held power tool according to claim 1, further comprising:
a sensor mounted on the housing and configured to generate a sensed sensor signal based on a sensed displacement of at least one component of the at least one holding unit and/or a sensed force exerted by the at least one component of the at least one holding unit,
wherein the hand-held power tool is switched off at least indirectly based on the sensed sensor signal.

* * * * *